United States Patent
Chakraborty et al.

(10) Patent No.: US 9,873,827 B2
(45) Date of Patent: Jan. 23, 2018

(54) METHODS OF RECOVERING HYDROCARBONS USING SUSPENSIONS FOR ENHANCED HYDROCARBON RECOVERY

(71) Applicant: Baker Hughes Incorporated, Houston, TX (US)

(72) Inventors: Soma Chakraborty, Houston, TX (US); Gaurav Agrawal, Aurora, CO (US); Devesh Kumar Agrawal, Houston, TX (US); Valery N. Khabashesku, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 460 days.

(21) Appl. No.: 14/519,496

(22) Filed: Oct. 21, 2014

(65) Prior Publication Data

US 2016/0376492 A1    Dec. 29, 2016

(51) Int. Cl.
| | |
|---|---|
| *E21B 43/16* | (2006.01) |
| *E21B 43/34* | (2006.01) |
| *E21B 43/22* | (2006.01) |
| *C09K 8/58* | (2006.01) |
| *C09K 8/592* | (2006.01) |

(52) U.S. Cl.
CPC .............. *C09K 8/58* (2013.01); *C09K 8/592* (2013.01); *E21B 43/16* (2013.01); *E21B 43/34* (2013.01); *C09K 2208/10* (2013.01)

(58) Field of Classification Search
CPC ... C09K 2208/10; E21B 43/267; E21B 43/26; E21B 43/16; E21B 43/34
See application file for complete search history.

(56) References Cited

U.S. PATENT DOCUMENTS

| | | | |
|---|---|---|---|
| 3,617,347 | A | 11/1971 | Kuratomi |
| 3,762,882 | A | 10/1973 | Grutza |
| 3,980,549 | A | 9/1976 | Grutza |
| RE33,767 | E | 12/1991 | Christini et al. |
| 5,164,220 | A | 11/1992 | Caballero |
| 5,277,940 | A | 1/1994 | Caballero |
| 5,496,463 | A | 3/1996 | Mori et al. |

(Continued)

FOREIGN PATENT DOCUMENTS

| | | |
|---|---|---|
| CN | 1380363 A | 11/2002 |
| CN | 101029359 A | 9/2007 |

(Continued)

OTHER PUBLICATIONS

Agrawal et al., U.S. Appl. No. 14/744,520, filed Jun. 19, 2015, and titled Methods and Suspensions for Recovery of Hydrocarbon Material From Subterranean Formations.

(Continued)

*Primary Examiner* — Zakiya W Bates
(74) *Attorney, Agent, or Firm* — TraskBritt

(57) ABSTRACT

Suspensions comprising polyhedral oligomeric silsesquioxane nanoparticles and at least one carrier fluid. The polyhedral oligomeric silsesquioxane may include functional groups and the suspension may further comprise carbon-based nanoparticles and silica nanoparticles. Related methods of recovering hydrocarbons from a subterranean formation using the suspension. The method comprises contacting hydrocarbons with the suspension to form an emulsion stabilized by the polyhedral oligomeric silsesquioxane nanoparticles.

20 Claims, 1 Drawing Sheet

(56) References Cited

U.S. PATENT DOCUMENTS

| | | | |
|---|---|---|---|
| 5,712,000 | A | 1/1998 | Wei et al. |
| 5,967,400 | A | 10/1999 | Bell et al. |
| 6,156,390 | A | 12/2000 | Henry et al. |
| 6,258,237 | B1 | 7/2001 | Gal-Or |
| 6,286,498 | B1 | 9/2001 | Sung |
| 6,638,570 | B2 | 10/2003 | Veerasamy |
| 6,752,709 | B1 | 6/2004 | Skibo et al. |
| 7,201,972 | B2 | 4/2007 | Shiozaki et al. |
| 7,820,130 | B2 | 10/2010 | Khabashesku et al. |
| 7,858,186 | B2 | 12/2010 | Khabashesku et al. |
| 2003/0220204 | A1 | 11/2003 | Baran, Jr. et al. |
| 2003/0228249 | A1 | 12/2003 | Fujimura et al. |
| 2005/0287952 | A1 | 12/2005 | Ryan et al. |
| 2006/0169450 | A1 | 8/2006 | Mang |
| 2006/0269467 | A1 | 11/2006 | Khabashesku et al. |
| 2007/0126312 | A1 | 6/2007 | Sung |
| 2007/0158619 | A1 | 7/2007 | Wang et al. |
| 2007/0199826 | A1 | 8/2007 | Son et al. |
| 2007/0298669 | A1 | 12/2007 | Barrera et al. |
| 2009/0155479 | A1 | 6/2009 | Xiao et al. |
| 2009/0211758 | A1 | 8/2009 | Bragg |
| 2009/0242414 | A1 | 10/2009 | Welz-Biermann et al. |
| 2010/0019456 | A1 | 1/2010 | Gerrard |
| 2010/0028675 | A1 | 2/2010 | Gogotsi et al. |
| 2010/0096139 | A1 | 4/2010 | Holcomb et al. |
| 2010/0243248 | A1 | 9/2010 | Golomb et al. |
| 2011/0024299 | A1 | 2/2011 | Reusmann |
| 2011/0108269 | A1 | 5/2011 | Van Den Berg et al. |
| 2011/0278002 | A1 | 11/2011 | McGuire |
| 2012/0148762 | A1 | 6/2012 | Wei et al. |
| 2012/0175534 | A1 | 7/2012 | Jung et al. |
| 2012/0181029 | A1 | 7/2012 | Saini et al. |
| 2013/0045897 | A1 | 2/2013 | Chakraborty et al. |
| 2013/0081335 | A1 | 4/2013 | Mazyar |
| 2013/0165353 | A1 | 6/2013 | Mazyar et al. |
| 2013/0341022 | A1 | 12/2013 | Nguyen et al. |
| 2014/0096964 | A1 | 4/2014 | Chakraborty et al. |
| 2014/0187449 | A1 | 7/2014 | Khabashesku et al. |
| 2014/0290958 | A1 | 10/2014 | Marr et al. |
| 2015/0047847 | A1 | 2/2015 | Mazyar et al. |
| 2015/0344786 | A1 | 12/2015 | Kuznetsov et al. |
| 2015/0368539 | A1 | 12/2015 | Tour et al. |

FOREIGN PATENT DOCUMENTS

| | | |
|---|---|---|
| CN | 102304737 A | 1/2012 |
| CN | 102354609 A | 2/2012 |
| CN | 102560415 A | 7/2012 |
| CN | 102719693 A | 10/2012 |
| CN | 102329976 B | 1/2013 |
| EP | 1826294 A1 | 8/2007 |
| JP | 62072511 A | 4/1987 |
| JP | 04157157 A | 5/1992 |
| JP | 2798523 B2 | 9/1998 |
| JP | 2006225730 A | 8/2006 |
| JP | 5010945 B2 | 8/2012 |
| JP | 2012200989 A | 10/2012 |
| KR | 1020080093625 A | 10/2008 |
| KR | 10-2009-0001161 A | 1/2009 |
| KR | 10-2009-0010406 A | 1/2009 |
| KR | 1020120027350 A | 3/2012 |
| KR | 1020130002085 A | 1/2013 |
| WO | 0075394 A1 | 12/2000 |
| WO | 2007148667 A1 | 12/2007 |

OTHER PUBLICATIONS

Alvarado et al., Enhanced Oil Recovery: An Update Review, Energies, vol. 3, (2010), pp. 1529-1575.
Bryant et al., Development of Nanoparticle-Stabilized Foams to Improve Performance of Water-less Hydraulic Fracturing, Quarterly Progress Report, Oct. 1, 2013-Dec. 13, 2013, 16 pages.
Chang et al., Electrodeposition of Aluminum on Magnesium Alloy in Aluminum Chloride (AlCl3)-1-Ethyl-3-Methylimidazolium Chloride (EMIC) Ionic Liquid and its Corrosion Behavior, Electrochemistry Communications, vol. 9, (2007), pp. 1602-1606.
Drexler et al., Amphiphilic Nanohybrid Catalysts for Reactions at the Water/Oil Interface in Subsurface Reservoirs, Energy & Fuels, vol. 26, (2012), pp. 2231-2241.
Liu et al., Functionalization of Nanoscale Diamond Powder: Fluoro-, Alkyl-, Amino-, and Amino Acid-Nanodiamond Derivatives, Chem. Mater. vol. 16, (2004), pp. 3924-3930.
Luu et al., Nanoparticles Adsorbed at the Water/Oil Interface: Coverage and Composition Effects on Structure and Diffusion, American Chemical Society, Langmuir, vol. 29, (2013), pp. 7221-7228.
McElfresh et al., Application of Nanofluid Technology to Improve Recovery in Oil and Gas Wells, Society of Petroleum Engineers, (2012), SPE 154827, 6 pages.
Monteiro et al., U.S. Appl. No. 14/490,214 entitled, Methods of Coating Substrates with Composite Coatings of Diamond Nanoparticles and Metal, filed Sep. 18, 2014.
Shen et al., Emulsions Stabilized by Carbon Nanotube-Silicon Nanohybrids, Languir, vol. 25, No. 18, (2009), pp. 10843-10851.
Simka et al., Electrodeposition of Metals from Non-Aqueous Solutions, Electrochimica Acta, vol. 54, (2009), pp. 5307-5319.
Suresh et al., U.S. Appl. No. 14/530,205 entitled, Compositions of Coated Diamond Nanoparticles, Methods of Forming Coated Diamond Nanoparticles, and Methods of Forming Coatings, filed Oct. 31, 2014.
Tsuda et al., Electrochemical Applications of Room-Temperature Ionic Liquids, The electrochemical Society Interface, Spring 2007, pp. 42-49.
Underwood, Ervin E., Quantitative Stereology, Addison Wesley Publishing Company, Inc., (1970), pp. 80-109.
Wasan et al., Spreading of Nanofluids on Solids, Nature, vol. 423, May 8, 2003, pp. 156-159.
Wu et al., Functionalization of Carbon Nanotubes by an Ionic-Liquid Polymer: Dispersion of PT and PtRu Nanoparticles on Carbon Nanotubes and Their Electrocatalytic Oxidation of Methanol**, Angew. Chem. Int. Ed., vol. 48, (2009), pp. 4751-4754.
Xue et al., Functionalization of Graphene Oxide with Polyhedral Oligomeric Silsesquioxane (POSS) for Multifunctional Applications, Journal of Physical Chemistry Letters, vol. 3 (2012), pp. 1607-1612.
The Free Dictionary, "Steel", 2015, p. 1-6.
Kuznetsov et al., U.S. Appl. No. 14/296,857, titled Flocculants and methods for Recovering Bitumen From Oil Sands, filed Jun. 5, 2014.
Suresh et al., U.S. Appl. No. 14/169,432, titled Nano-Surfactants for Enhanced Hydrocarbon Recovery, and Methods of Forming and Using such Nano-Surfactants, filed Jan. 31, 2014.
Suresh et al., U.S. Appl. No. 14/289,873, titled Suspensions Including Organic Bases for Enhanced Oil Recovery and Methods of Obtaining Hydrocarbons Using Such Suspensions, filed May 29, 2014.
Jee et al., Surface Functionalization and Physicochemical Characterization of Diamond Nanoparticles, Current Applied Physics, vol. 9, No. 2, Mar. 2009, pp. e144-e147.
Tsubota et al., Composite Electroplating of Ni and Surface-Modified Diamond Particles with Silane Coupling Regent, Diamond & Related Materials, vol. 14, No. 3/7, Mar.-Jul. 2005, pp. 608-612.
Helmenstine, T., Periodic Table of the Elements, Chemistry.About. Com, 2014, 1 page.
Kuznetsov et al., U.S. Appl. No. 14/289,838, titled Methods of Obraining a Hydrocarbon Material From a Mined Material, and Related Stabilized Emulsions, filed May 29, 2014.
Lou et al., Electroplating, Encyclopedia of Chemical Processing, Taylor & Francis, (2006), pp. 1-10.
International Search Report for International Application No. PCT /US2015/054138 dated Dec. 17, 2015, 3 pages.
International Written Opinion for International Application No. PCT /US2015/054138 dated Dec. 17, 2015, 7 pages.
Krueger, Anke, "The structure and reactivity of nanoscale diamond," Journal of Materials Chemistry, 2008, vol. 18, p. 1485-1492.

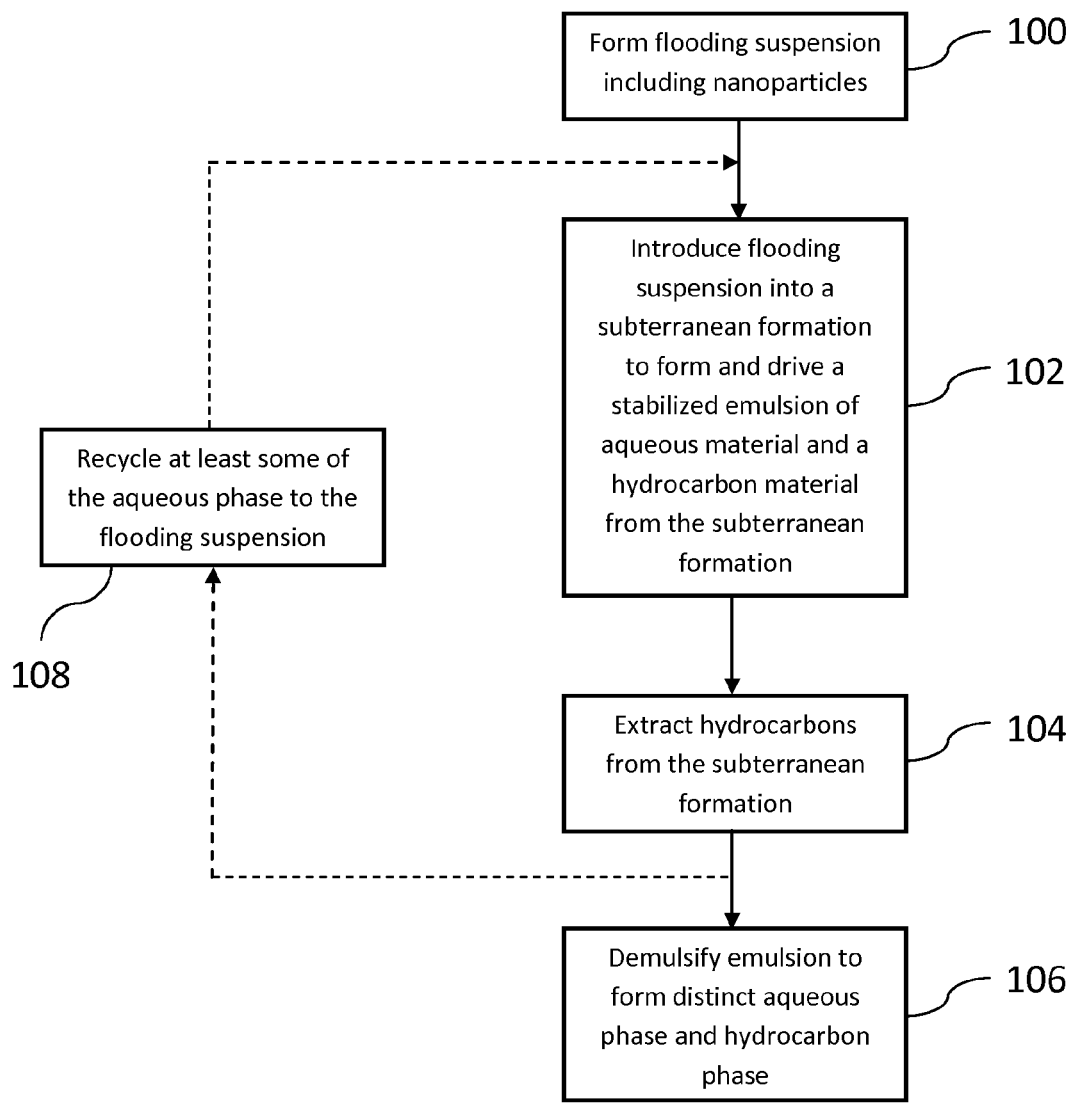

METHODS OF RECOVERING HYDROCARBONS USING SUSPENSIONS FOR ENHANCED HYDROCARBON RECOVERY

TECHNICAL FIELD

Embodiments of the disclosure relate generally to methods of recovering a hydrocarbon material from a hydrocarbon-containing material, such as a subterranean formation. More particularly, embodiments of the disclosure relate to methods of forming a flooding suspension including functionalized nanoparticles, methods of recovering hydrocarbons using the functionalized nanoparticles, and to suspensions including the functionalized nanoparticles.

BACKGROUND

Water flooding is a conventional process of enhancing the extraction of hydrocarbon materials (e.g., crude oil, natural gas, etc.) from subterranean formations. In this process, an aqueous fluid (e.g., water, brine, etc.) is injected into the subterranean formation through injection wells to sweep a hydrocarbon material contained within interstitial spaces (e.g., pores, cracks, fractures, channels, etc.) of the subterranean formation toward production wells. One or more additives may be added to the aqueous fluid to assist in the extraction and subsequent processing of the hydrocarbon material.

For example, in some approaches, a surfactant, solid particles (e.g., colloids), or both are added to the aqueous fluid. The surfactant and/or the solid particles can adhere to or gather at interfaces between a hydrocarbon material and an aqueous material to form a stabilized emulsion of one of the hydrocarbon material and the aqueous material dispersed in the other of the hydrocarbon material and the aqueous material. Surfactants may decrease the surface tension between the hydrocarbon phase and the water phase, such as, for example, in an emulsion of a hydrocarbon phase dispersed within an aqueous phase. Stabilization by the surfactant, the solid particles, or both, lowers the interfacial tension between the hydrocarbon and water and reduces the energy of the system, preventing the dispersed material (e.g., the hydrocarbon material, or the aqueous material) from coalescing, and maintaining the one material dispersed as units (e.g., droplets) throughout the other material. Reducing the interfacial tension increases the permeability and the flowability of the hydrocarbon material. As a consequence, the hydrocarbon material may be more easily transported through and extracted from the subterranean formation as compared to water flooding processes that do not employ the addition of a surfactant and/or solid particles. The effectiveness of the emulsion is determined in large part by the ability of the emulsion to remain stable and ensure mixing of the two phases.

However, application of surfactants is usually limited by the ability of the surfactant to sufficiently contact a large portion of hydrocarbons located within the subterranean formation and form an emulsion containing the hydrocarbons and the aqueous material carrying the surfactants. For example, the surfaces of the hydrocarbon-containing reservoir may not be sufficiently contacted by the surfactants or the surfactants may not sufficiently adhere to hydrocarbon bearing surfaces of the subterranean formation.

BRIEF SUMMARY

Embodiments disclosed herein include suspensions comprising polyhedral oligomeric silsesquioxane nanoparticles and to methods of recovering a hydrocarbon material from a subterranean formation using a suspension comprising the polyhedral oligomeric silsesquioxane nanoparticles. For example, in accordance with one embodiment, a method of recovering a hydrocarbon material comprises forming a suspension comprising polyhedral oligomeric silsesquioxane nanoparticles, introducing the suspension into a subterranean formation containing hydrocarbons, forming a stabilized emulsion of the suspension and the hydrocarbons within the subterranean formation, and removing the emulsion from the subterranean formation.

In additional embodiments, a method of extracting a hydrocarbon material from a subterranean formation comprises mixing polyhedral oligomeric silsesquioxane nanoparticles with a carrier fluid, introducing the carrier fluid into a subterranean formation and contacting hydrocarbons within the subterranean formation with the nanoparticles to form an emulsion comprising the nanoparticles, an aqueous phase, and a hydrocarbon phase dispersed within the aqueous phase, transporting the emulsion to a surface of the subterranean formation, and separating the hydrocarbons from the emulsion.

In further embodiments, a suspension for removing hydrocarbons from a subterranean formation comprises a carrier fluid comprising at least one of water, brine, steam, and an organic solvent, polyhedral oligomeric silsesquioxane nanoparticles dispersed within the carrier fluid, and fumed silica nanoparticles dispersed within the carrier fluid.

BRIEF DESCRIPTION OF THE DRAWING

FIG. 1 is a simplified flow diagram depicting a method of extracting hydrocarbons from a subterranean formation, in accordance with embodiments of the disclosure.

DETAILED DESCRIPTION

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering hydrocarbons from a hydrocarbon-bearing subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. Additional acts or materials to extract a hydrocarbon material from a subterranean formation or from bitumen may be performed by conventional techniques.

Methods of increasing hydrocarbon recovery from a subterranean formation using a suspension including polyhedral oligomeric silsesquioxane (POSS) nanoparticles are described. The POSS nanoparticles may be functionalized to increase interactions between the POSS nanoparticles and hydrocarbons within the subterranean formation. The suspension including the POSS nanoparticles is introduced into the subterranean formation and contacts the hydrocarbons within the formation. Upon contacting the hydrocarbons, the suspension reduces an interfacial tension between an aqueous phase and the hydrocarbon phase. The nanoparticles stabilize an emulsion of the hydrocarbon phase dispersed within the aqueous phase of the suspension or an emulsion of the aqueous phase dispersed within the hydrocarbon phase. The stabilized emulsion is transported to the surface where emulsion may be destabilized and the hydrocarbons recovered therefrom.

Referring to FIG. 1, a simplified flow diagram illustrating a method of recovering a hydrocarbon material from a subterranean formation is shown. The method may include a suspension formation process 100 including forming a flooding suspension including POSS nanoparticles, silica nanoparticles, carbon-based nanoparticles, and combinations thereof with a carrier fluid that may include at least one of water, steam, brine, and an organic solvent; a flooding process 102 including introducing the flooding suspension into a subterranean formation including hydrocarbon materials and contacting the hydrocarbons with the flooding suspension to form a stabilized emulsion; an extraction process 104 including flowing (e.g., driving, sweeping, forcing, etc.) the stabilized emulsion from the subterranean formation; a separation process 106 including separating the hydrocarbon material from the emulsion to form a distinct aqueous phase and a distinct hydrocarbon phase; and an optional recycle process 108 including recycling at least a portion of the aqueous phase including at least one of the POSS nanoparticles, the silica nanoparticles, and the carbon-based nanoparticles back into the flooding suspension.

As used herein, the term "nanoparticle" means and includes particles having an average particle size of less than about 1,000 nm. Nanoparticles employed in embodiments of the present disclosure may include POSS nanoparticles, silica nanoparticles, carbon-based nanoparticles, and combinations thereof.

The suspension formation process 100 may include forming a suspension including at least one of POSS nanoparticles, silica nanoparticles, and carbon-based nanoparticles dispersed within at least one carrier fluid. In sonic embodiments, the suspension may be formed from POSS nanoparticles and at least one of fumed silica functionalized grapheme, and functionalized carbon nanotubes. As used herein, the term "suspension" means and includes a material including at least one carrier fluid in which the nanoparticles are substantially uniformly dispersed. The suspension may be a flooding suspension used in enhanced oil recovery processes, such as used in water flooding, cyclic steam stimulation (CSS), steam assisted gravity drainage (SAGD), or other stimulation process. The nanoparticles of the flooding suspension may be compatible with other components (e.g., materials, constituents, etc.) of the flooding suspension. As used herein, the term "compatible" means that a material does not impair the functionality of the nanoparticles or cause the nanoparticles to lose functionality as a surfactant (i.e., the nanoparticles may enhance stability of an emulsion of a hydrocarbon phase and an aqueous phase).

The flooding suspension may be formed by mixing the nanoparticles with a carrier fluid. The carrier fluid may include at least one of water, steam, brine, alcohols such as methanol, ethanol, propanol, etc., and an organic solvent such as hexane, heptane, toluene, and benzene.

The flooding suspension may be formulated to include a concentration of the nanoparticles ranging from between about 10 ppm to about 10,000 ppm. The flooding suspension may have a concentration of at least one of POSS nanoparticles, silica nanoparticles, and carbon-based nanoparticles ranging from between about 10 ppm to about 100 ppm, between about 100 ppm and about 500 ppm, between about 500 ppm and about 1,000 ppm, between about 1,000 ppm and about 2,000 ppm, between about 2,000 ppm and about 5,000 ppm, or between about 5,000 ppm and about 10,000 ppm. The emulsion including the nanoparticles and hydrocarbons may include the same, a higher, or a lower concentration of the nanoparticles than the flooding suspension.

The POSS nanoparticles may have the general formula of $RSiO_{1.5}$ wherein R is hydrogen, an inorganic group, or an organic group. The POSS nanoparticles may have an open or a closed cage structure such as cubic, hexagonal prism, octagonal prism, decagonal prism, dodecagonal prism, etc. A portion of the POSS nanoparticles may include a first structure and at least another portion of the POSS nanoparticles may include a second, different structure. POSS may be prepared by acid or base catalyzed condensation of functionalized silicon-containing monomers such as tetraalkoxysilanes including tetramethoxysilane, alkyltrialkoxysilanes such as methyltrimethoxysilan and methyltrimethoxysilane, as well as other groups.

At least a portion of the nanoparticles may include a base portion including silica. Surfaces of the silica base portion may be functionalized with one or more functional groups to impart desired physical and chemical properties to the surface of the nanoparticles. The silica nanoparticles may be fumed silica nanoparticles.

At least a portion of the nanoparticles may be carbon-based. The carbon-based nanoparticles may include one or more of graphite, graphene, graphene oxide, carbon nanotubes, carbon nanodiamonds, fullerenes, etc. The carbon nanotubes may be single-walled carbon nanotubes (SW-CNTs), multi-walled carbon nanotubes (MWCNTs), or combinations thereof. The graphite, graphene, graphene oxide, carbon nanotubes, carbon nanodiamonds, and fullerenes may be functionalized with one or more functional groups.

The nanoparticles may be structured and formulated to react with materials present within hydrocarbons located within a subterranean formation. By way of non-limiting example, contacting a hydrocarbon-containing material with a flooding suspension including the nanoparticles may form an emulsion at locations where the flooding suspension contacts the hydrocarbon-containing material. The nanoparticles may stabilize the emulsion during transportation of the emulsion to the surface of the subterranean formation.

The nanoparticles may include one or more functional groups configured and formulated to increase an interaction between the nanoparticles and at least one of the subterranean formation, hydrocarbons within the subterranean formation, and other nanoparticles within the suspension. By way of example only, amine functionalized nanoparticles may increase the interaction of the nanoparticles with a subterranean formation including carbonate, limestone, and combinations thereof.

The functional groups may include an alkyl group, an alkenyl group (C=C), an alkynyl group (C≡C), an aryl group, an aralkyl group, an alkaryl group, a lactone group, a carbonyl group (a group including a carbon-oxygen double bond (C=O) (e.g., a carboxylate group, a carboxyl group, a ketone, an aldehyde, an ester group, an alkoxy group, etc.), an epoxy group, a halide group, an organohalide group, a hydroxyl group, an imide group (a nitrogen atom with two acyl groups bonded thereto ($(RCO)_2NR'$)), an amine group (e.g., primary, secondary, and tertiary amine groups), an amide group (R—CONR'R"), an imine group (R—C=N), a nitrate group ($RONO_2$), a nitroso group (R—N=O), a nitro group ($RNO_2$), a pyridyl group ($RC_5H_4N$), a hydrozone group (RR'C=$NNH_2$), an azide group (R—N=N=N), an azo group (RN=NR'), a carboxyamide (R—CO—NR'R", acetamide), a cyanate group (R—C≡N), an isocyanate group (RN=C=O), a quarternary ammonium group, a quaternary phosphonium group, a tertiary sulphonium group, an organosulfur group, an imidazolium group, a polyethylenimine (PEI) group, a soluble polymer terminated with amine (e.g., polyethylene oxide terminated with amine), a functionalized polymeric group, such as an acrylic chain having carboxylic acid groups, hydroxyl groups, and/or amine groups, functionalized oligomeric groups, and combinations thereof.

The functional groups may be attached to the nanoparticles directly, and/or through intermediate functional groups (e.g., carboxy groups, amino groups, etc.) by way of one or more conventional reaction mechanisms (e.g., amination, nucleophilic substitution, oxidation, Stille coupling, Suzuki coupling, diazo coupling, organometallic coupling, etc.). In further embodiments, at least some of the nanoparticles are formulated to exhibit desired affinities and/or aversions for different materials without having to perform additional processing acts to attach functional groups thereto. For example, one or more portions (e.g., shells, cores, etc.) of at least some of the nanoparticles may already exhibit desired affinities and/or aversions for different materials without having to perform additional functionalization acts.

In yet other embodiments, the flooding suspension may include a mixture of the nanoparticles. For example, a mixture of POSS nanoparticles may include a portion of nanoparticles with at least one type of functional group and at least another portion of nanoparticles with at least another type of functional group. In other embodiments, the flooding suspension may include POSS nanoparticles with a first type of functional group and at least one of carbon-based nanoparticles with a second type of functional group and silica nanoparticles with a third type of functional group. In yet other embodiments, the flooding suspension may include POSS nanoparticles having a first functional group with fumed silica having a second, different functional group than the first functional group.

Each of the nanoparticles may include more than one type of functional group. For example, each nanoparticle may include one or more of an alkyl group, an alkenyl group, an alkynyl group, an aryl group, an aralkyl group, an alkaryl group, a lactone group, a carbonyl group, an epoxy group, a halide group, an organohalide group, a hydroxyl group, an imide group, an amine group, an amide group, an imine group, a nitrate group, a nitroso group, a nitro group, a pyridyl group, a hydrozone group, an azide group, an azo group, a carboxyamide, a cyanate group, an isocyanate group, a quarternary ammonium group, a quaternary phosphonium group, a tertiary sulphonium group, an organosulfur group, an imidazolium group, a polyethylenimine (PEI) group, a soluble polymers terminated with an amine, and at least another of an alkyl group, an alkenyl group, an alkynyl group, an aryl group, an aralkyl group, an alkaryl group, as lactone group, a carbonyl group, an epoxy group, a halide group, an organohalide group, as hydroxyl group, an imide group, an amine group, an amide group, an imine group, a nitrate group, a nitroso group, a nitro group, a pyridyl group, a hydrozone group, an azide group, an azo group, a carboxyamide, a cyanate group, an isocyanate group, a quarternary ammonium group, a quaternary phosphonium group, a tertiary sulphonium group, an organosulfur group, an imidazolium group, a polyethylenimine (PEI) group, a soluble polymers terminated with an amine.

Alkyl groups may include one or more of a methyl, ethyl, propyl, butyl, pentyl, hexyl, heptyl, octyl, dodecyl, and/or octadecyl group. The alkyl group may include an alkyl amine, such as methylamine, ethylamine, propylamine, butylamine, pentylamine, hexylamine, heptylamine, octylamine, dodecylamine, or octadecylamine.

The alkenyl groups may include one or more of an ethenyl group, a propenyl group, a methylethenyl group, a butenyl group, a pentenyl group, a hexenyl group, a heptenyl group, an octenyl group, a dodecenyl group, and/or an octadecenyl group. The double bond may be located at any location along the alkenyl chain (e.g., 2-propenyl, 1-propenyl). The alkynyl groups may include one or more of ethyne (acetylene), propyne, butyne, pentyne, hexyne, heptyne, octyne, dodecyne, and/or octadecyne. The triple bond may be located at any location along the alkynyl chain. In some embodiments, the nanoparticles may include one or more alkenyl or alkynyl groups, in addition to one or more other functional groups.

The functional groups may include an aryl group (e.g., a phenyl group, a hydroxyphenyl group, and combinations thereof), an aralkyl group, and an alkaryl group such as benzyl groups attached via the aryl portion (e.g., 4-methylphenyl, 4-hydroxymethylphenyl, or 4-(2-hydroxyethyl)phenyl, and/or aralkyl groups attached at the benzylic (alkyl) position, such as in a phenylmethyl and 4-hydroxyphenylmethyl groups, and/or attached at the 2-position, such as in a phenethyl and 4-hydroxyphenethyl groups).

Carbonyl functional groups may include a ketone, an aldehyde, a carboxylate group (RCOO—), an ester group, an alkoxy group (an alkyl group with a carbon-oxygen single bond (R—O—R')), and combinations thereof. For example, the carbonyl group may include an aldehyde, such as alkyl aldehydes including methanal (formaldehyde), ethanal (acetaldehyde), propenal (acrolein), butanal (butryaldehyde), pentanal, hexanal, heptanal, octanal, dodecanal, and octadecanal. One or more carbon atoms of the aldehyde may include one or more additional functional groups, such as a halide group, a hydroxyl group, a sulfur-containing group, an aryl group, or an amine group.

The functional groups may include a ketone, including diketones and cyclic ketones. The ketones may be saturated or unsaturated and may be either symmetric or asymmetric. The ketones may include a propanone (acetone), butanone, a pentanone, a hexanone, a heptanone, octonone, dodecanone, and/or octadecanone groups. Non-limiting examples of cyclic ketones include isophorene, cyclopropanone, cyclobutanone, cyclopentanone, cyclohexanone, muscone, and 3-methylpentadecanone.

The functional groups may include a carboxylate group ($RCOO^-$). The carboxylate group may include a carboxylic acid group, such as methanoic acid, ethanoic acid, propanoic acid, butanoic acid, pentanoic acid, hexanoic acid, heptanoic acid, octanoic acid, nonanoic acid, decanoic acid, dodecanoic acid, and/or octadecanoic acid (stearic acid). A carboxylate group may decrease the hydrophobicity of nanoparticles. In some embodiments, the nanoparticles include one or more carboxylate groups and one or more of an alkyl group, an alkenyl group, an alkynyl group, a hydroxyl group, a ketone, and an aldehyde, and an amine group.

The functional groups may include one or more ester groups. The ester group may include methyl acetate, ethyl acetate, propyl acetate, butyl acetate, pentyl acetate, hexyl acetate, heptyl acetate, octyl acetate, dodecyl acetate, octadecyl acetate, isoamyl acetate, ethyl butyrate, isopropyl butanoate, ethyl propanoate, ethyl benzoate, and butyl acetate.

The functional groups may include one or more alkoxy groups, such as a methoxy, ethoxy, propoxy, butoxy, pentoxy, hexoxy, hepoxy, octoxy, dodecoxy, or octadecoxy group.

The functional groups may include one or more halogen atoms, such as in organohalides. The functional groups may include one or more of fluorine, chlorine, bromide, and iodine. Non-limiting examples of halogen-containing compounds include haloalkanes (alkyl halides), haloalkenes (alkenyl halides), haloaromatics (aryl halides), and acyl halides (RCOX, where X is a halide). By way of non-limiting example, the functional group may be hydrophobic and may include methyl halide, ethyl halide, propyl halide, butyl halide, pentyl halide, hexyl halide, heptyl halide, octyl halide, dodecyl halide, octadecyl halide, an aryl halide (e.g., a chlorobenzene), and combinations thereof. In some embodiments, a halogen atom may be directly attached to a surface of the nanoparticles.

The functional groups may include one or more hydroxyl groups. In some embodiments, the hydroxyl group includes an alcohol group. For example, the hydroxyl group may include methanol, ethanol, propanol, butanol, pentanol, hexanol, heptanol, octanol, dodecanol, octadecanol, and combinations thereof. One or more of the functional groups described above may also include one or more hydroxyl groups. In some embodiments, the hydrophobic group is ethanol amine, diethanol amine, triethanol amine, or a mixture thereof.

The functional groups may include azo compounds. The azo compound may be an aryl azo compound or an alkyl azo compound. In other embodiments, the functional groups are a cyanate group or an isocyanate group.

The functional groups may include imide groups (a nitrogen atom with two acyl groups bonded thereto ($RCO)_2NR'$)), such as N-ethylmaleimide or phthalimide or imines such as ethanimine, a propanimine, a butanimine, a pentanimine, a hexanimine, a heptanimine, an octanimine, a dodecanimine, and/or an octadecanimine.

The functional groups may include amine groups. Amine functional groups may include a primary amine ($RNH_2$), a secondary amine (RR'NH), or a tertiary amine (RR'R"N). At least one of the groups attached to the amine (e.g., R, R', or R") may include a hydrophobic group, in some embodiments, the groups attached to the amine may include other functional groups such as hydroxyl groups, carboxylate groups, carboxyl groups, sulfate groups, phosphate groups, or cationic groups such as amine groups. The groups may comprise the same functional group or may include different functional groups. The functional group may include polymers with pendant amine groups (e.g., substituted amine functional groups). In some embodiments, the groups may include poly ethyleneimine, poly propyleneimine, poly(vinylpyridine), polyvinyl imidazole, and copolymers thereof (e.g., a copolymer of poly ethyleneimine and one or more of poly(vinylpyridine) and polyvinylimidazole, or a copolymer of poly(vinylpyridine) with polyvinyl imidazole).

The amine may be a polyamine (e.g., a compound including a plurality of amine groups), such as a diamine, a triamine, a tetraamine, etc. The nanoparticles may include polyamines such as ethylene diamine, propylene diamine, butylene diamine, or mixtures thereof.

The functional groups may include an amide group, a sulfonamide (RSONHR'R"), or a phosphoamide (RPONHR'R"). The amide may include methanamide, ethanamide, propanamide, propamide, butamide, pentamide, hexamide, heptamide, octanamide, nonamide, decanamide, dodecanamide, and/or octadecamide. Sulfonamides may include trifluoromethanesulfonamide, methylsulfanamoyl chloride ($CH_4ClNO_2S$), methane sulfonamide ($CH_5NO_2S$), cyclopropanesulfonamide ($C_3H_7NO_2S$), 4-nitrobenzenesulfonamide ($C_6H_6N_2O_4S$), and benzenesulfonamide ($C_6H_7NO_2S$).

The nanoparticles may include one type of nanoparticle bonded to at least another type of nanoparticle. A suspension including the nanoparticles may include a first nanoparticle (e.g., one of a POSS nanoparticle, a silica nanoparticle, and a carbon-based nanoparticle) surrounded by at least one second nanoparticle (e.g., another of a POSS nanoparticle, a silica nanoparticle, and a carbon-based nanoparticle). The first nanoparticle may include at least one first functional group attached to outer surfaces thereof. The second nanoparticle may include at least one second functional group attached to outer surfaces thereof. The first functional group and the second functional group may be any of the functional groups described above. The first functional group and the second functional group may be the same or different. In some embodiments, a POSS nanoparticle may be bonded to at least one of graphene nanoparticles and carbon nanotubes.

One or more of the functional groups attached to the nanoparticles may be anionic and one or more of the functional groups attached to the nanoparticles may be cationic. In some embodiments, some nanoparticles may include anionic functional groups attached to surfaces thereof, and other nanoparticles may include cationic functional groups attached to surfaces thereof ionic bonds may attach the first nanoparticle to the second nanoparticle. For example, ionic bonds between the first functional groups of the first nanoparticle and the second functional groups of the second nanoparticle may attach the first nanoparticle to the second nanoparticle. Anionic functional groups may include hydroxyl groups, carboxylate groups, carboxyl groups, sulfate groups, and phosphate groups. Cationic functional groups may include amine groups, amide groups, quaternary ammonium groups, quaternary phosphonium groups, tertiary sulphonium groups, pyridinium groups, imidazolium groups, polyethylenimine (PEI) groups, and soluble polymers terminated with amine (e.g., polyethylene oxide terminated with amine).

By way of non-limiting example, the flooding suspension may include a first portion of nanoparticles including cationic functional groups and a second portion of nanoparticles including anionic functional groups. In some embodiments, at least one of POSS nanoparticles, carbon-based nanoparticles, and silica nanoparticles may include either cationic functional groups or anionic functional groups attached thereto and at least another of the POSS nanoparticles, carbon-based nanoparticles, and silica nanoparticles may include the other of cationic functional groups and anionic functional groups attached thereto. As another example, POSS nanoparticles may be attached to or coated with at least one of carbon-based nanoparticles and silica based nanoparticles by ionic bonds between the POSS nanoparticles and the at least one of carbon-based nanoparticles and silica based nanoparticles. For example, at least one anionic functional group may be formed on POSS nanoparticles and at least one cationic functional group may be formed on at least one carbon-based nanoparticle to form an ionic bond between the carbon-based nanoparticle and at least one POSS nanoparticle. Thus, the POSS nanoparticles may be coated with functionalized graphene.

In some embodiments, the nanoparticles may include POSS nanoparticles coated with a carbon-based material, such as graphene. By way of example only, POSS nanoparticles may be coated with graphene by functionalizing outer surfaces of the POSS nanoparticles with a charged species (e.g., cationic functional groups or anionic functional groups) and then immersing the functionalized POSS nanoparticles in a solution containing an oppositely charged species, such as a graphene species having a charge opposite to the charged species on the surfaces of the POSS nanoparticles.

In other embodiments, at least one type of nanoparticle may be attached to at least another type of nanoparticle by at least one covalent bond. The nanoparticles may be bonded to each other by coupling reactions, such as Suzuki Coupling, Stille Coupling, Glaser coupling, diazo coupling, nucleophilic substitution, oxidation, organometallic coupling, the Wurtz reaction, Ullmann coupling, the Gomberg-Bachmann reaction, Sonogashira coupling, the Buchwald-Hartwig amination coupling, etc. The coupling reactions may attach one type of nanoparticle (e.g., one of a POSS nanoparticle, a carbon-based nanoparticle, and a silica nanoparticle) to another type of nanoparticle (another of a POSS nanoparticle, a carbon-based nanoparticle, and a silica nanoparticle).

By way of non-limiting example, POSS nanoparticles including exposed amine groups may be mixed with other nanoparticles including exposed hydroxyl groups. The exposed amine groups of the POSS nanoparticles and the exposed hydroxyl groups of the other nanoparticles may react in a condensation reaction to form a nanoparticle including a core POSS nanoparticle surrounded by the other nanoparticles. In some embodiments, a POSS nanoparticle may be surrounded by carbon-based nanoparticles, such as carbon nanotubes, nanodiamonds, or graphene. A nitrogen atom may bridge the covalently bonded nanoparticles.

The nanoparticles may include a carbon-based nanoparticle coated with at least one POSS nanoparticle. By way of example, carbon-based nanoparticles may include oxygen containing groups such as epoxy groups, carboxyl groups, and combinations thereof. The carbon-based nanoparticles may be covalently bonded to POSS nanoparticles having amine functional groups by forming an amide group between the carbon-based nanoparticles and the POSS nanoparticles. In some embodiments, POSS nanoparticles are covalently bonded to and form a coating on at least one of graphene oxide, graphene, and carbon nanotubes.

By way of another non-limiting example, a solution may include POSS nanoparticles including at least one exposed hydroxyl group. At least one of carbon-based nanoparticles including exposed hydroxyl groups or silica nanoparticles including exposed hydroxyl groups may be mixed into the solution including the POSS nanoparticles. Exposed hydroxyl groups of the POSS nanoparticles may react with exposed hydroxyl groups of the carbon-based nanoparticles or the silica nanoparticles in a condensation reaction to form a nanoparticle including at least one POSS nanoparticle attached via a covalent bond to at least one other nanoparticle. In some embodiments, the POSS nanoparticles with exposed hydroxyl groups may react with each other to form nanoparticles including more than one POSS nanoparticle.

In yet other embodiments, POSS nanoparticles may be coordinated with at least one metal, such as, for example, titanium, vanadium, zirconium, aluminum, iron, nickel, cobalt, manganese, chromium, copper, zinc, and tungsten. At least a portion of the nanoparticles may include POSS coordinated with any of the aforementioned metals.

At least some of the nanoparticles may be coated with metals, such as iron, nickel, cobalt, aluminum, copper, titanium, chromium, vanadium, molybdenum, lead, platinum, rhodium, gold, silver, zinc, cadmium, and combinations thereof. In some embodiments, POSS nanoparticles may be coated with graphene and the graphene over the POSS nanoparticles may be coated with one or more metals.

With continued reference to FIG. 1, the flooding process 102 may include introducing the flooding suspension including the nanoparticles into a subterranean formation to detach a hydrocarbon material from surfaces of the subterranean formation and form a stabilized emulsion of the hydrocarbon material and an aqueous material (e.g., the carrier fluid). The flooding suspension may be provided into the subterranean formation through conventional processes. For example, pressurized steam may be pumped into an injection well extending to a desired depth in the subterranean formation, and may infiltrate (e.g., permeate, diffuse, etc.) into interstitial spaces of the subterranean formation. The extent to which the flooding suspension infiltrates the interstitial spaces of the subterranean formation at least partially depends on the properties of the flooding suspension (e.g., density, viscosity, material composition (e.g., properties of the nanoparticles), etc.), and the hydrocarbon materials (e.g., molecular weight, density, viscosity, etc.) contained within interstitial spaces of the subterranean formation.

The pH of the flooding suspension may be altered to control the solubility of the nanoparticles within the flooding suspension. For example, where the nanoparticles include amine functional groups or other anionic functional groups such as hydroxyl groups, carboxyl groups, carbonyl groups, phosphate groups, or thiol groups, increasing the pH of the carrier fluid or the flooding suspension may increase the solubility of the nanoparticles in the flooding suspension.

The nanoparticles are structured and formulated to facilitate formation of a stabilized emulsion of a hydrocarbon material and an aqueous material. For example, the nanoparticles may be structured and formulated to gather (e.g., agglomerate) at, adhere to, and/or absorb to interfaces of a hydrocarbon material and an aqueous material to form an emulsion comprising units (e.g., droplets) of one of the hydrocarbon material and the aqueous material dispersed in the other of the hydrocarbon material and the aqueous material. The nanoparticles may prevent the dispersed material (e.g., the hydrocarbon material or the aqueous material) from coalescing, and may thus maintain the dispersed material as units throughout the other material.

The nanoparticles may be configured to remain soluble within the suspension as the suspension travels through the subterranean formation. The nanoparticles may not agglomerate or gel within the suspension. Rather, the nanoparticles may be configured to contact hydrocarbons within the subterranean formation and create a stabilized emulsion, without agglomerating. In some embodiments, the emulsion may be stabilized as the nanoparticles uniformly disperse throughout the flooding suspension and the emulsion.

In addition to the nanoparticles, the flooding suspension may include at least one additive. By way of non-limiting example, the additive may be at least one of a surfactant, a catalyst, a dispersant, a scale inhibitor, a scale dissolver, a defoamer, a biocide, or another additive used in the web service industry. The flooding suspension may be substantially homogeneous (e.g., nanoparticles and the additive, if present, may be uniformly dispersed throughout the flooding suspension), or may be heterogeneous (e.g., the nanoparticles and the additive, if present, may be non-uniformly dispersed throughout the flooding suspension.

The extraction process 104 may include flowing (e.g., driving, sweeping, forcing, etc.) the stabilized emulsion from the subterranean formation to the surface. The nanoparticles prevent the dispersed material from coalescing and enable substantial removal of hydrocarbons from the subterranean formation.

Once the hydrocarbons are removed from the subterranean formation, at least a portion of the emulsion may be destabilized in the emulsion destabilization process 106 to form distinct, immiscible phases including an aqueous phase and a hydrocarbon phase. One or more properties (e.g., temperature, pH, material composition, pressure, etc.) of the stabilized emulsion or the aqueous phase may be modified (e.g., altered, changed) to at least partially destabilize the emulsion. For example, the pH of the aqueous phase may be modified to increase the solubility of the nanoparticles within the aqueous phase and destabilize the emulsion, forming distinct, immiscible phases. In some embodiments, the aqueous phase may be separated from the hydrocarbon phase by decreasing a pH of the emulsion. By way of example, where the nanoparticles include amine functional groups, the emulsion may be demulsified by decreasing the pH of the emulsion (e.g., decreasing the pH to neutral or slightly acidic, such as between about 5.0 and about 7.0), by increasing the pH of the aqueous phase, and combinations thereof. The pH of the emulsion may be decreased by adding hydrochloric acid, phosphoric acid, acetic acid, another acid, or combinations thereof to the emulsion.

A demulsifier may be added to the emulsion to destabilize the emulsion and form distinct, immiscible phases including an aqueous phase and the hydrocarbon phase. In some embodiments, the emulsion is destabilized by adjusting the pH of at least one of the aqueous phase and the emulsion and by adding a demulsifier to the emulsion.

The optional recycle process 108 may include recycling at least a portion of the aqueous phase including at least one of the POSS nanoparticles, the silica nanoparticles, and the carbon-based nanoparticles recovered in the emulsion destabilization process 106 back into the carrier fluid and mixing the recycled aqueous phase into the suspension. In some embodiments, at least a portion of the aqueous phase including the polyhedral oligomeric silsesquioxane nanoparticles may be recycled to the carrier fluid. Thus, the nanoparticles may be used to form a stabilized emulsion as they contact hydrocarbons within the subterranean formation, and at least a portion of the nanoparticles may be recovered and recycled to be reused again.

While the disclosure is susceptible to various modifications and alternative forms, specific embodiments have been shown by way of example in the drawings and have been described in detail herein. However, the disclosure is not intended to be limited to the particular firms disclosed. Rather, the disclosure is to cover all modifications, equivalents, and alternatives falling within the scope of the disclosure as defined by the following appended claims and their legal equivalents.

What is claimed is:

1. A method of recovering a hydrocarbon material, the method comprising:
   forming a suspension comprising polyhedral oligomeric silsesquioxane nanoparticles;
   introducing the suspension into a subterranean formation containing hydrocarbons;
   forming a stabilized emulsion of the suspension and the hydrocarbons within the subterranean formation; and
   removing the emulsion from the subterranean formation.

2. The method of claim 1, wherein forming a suspension comprising polyhedral oligomeric silsesquioxane nanoparticles comprises forming a suspension comprising polyhedral oligomeric silsesquioxane nanoparticles including at least one amine functional group.

3. The method of claim 1, wherein forming a suspension comprising polyhedral oligomeric silsesquioxane nanoparticles comprises forming a suspension comprising polyhedral oligomeric silsesquioxane nanoparticles including at least one functional group selected from the group consisting of an alkyl group, an alkenyl group, an alkynyl group, an aryl group, an aralkyl group, an alkaryl group, a lactone group, a carbonyl group, an epoxy group, a halide group, an organohalide group, a hydroxyl group, an azo group, an imide group, an amine group, an amide group, an imine group, a nitrate group, a nitroso group, a nitro group, a pyridyl group, a hydrozone group, an azide group, an azo group, a carboxyamide group, a cyanate group, an isocyanate group, a quaternary ammonium group, a quaternary phosphonium group, a tertiary sulphonium group, an organosulfur group, imidazolium groups, and polyethylenimine (PEI) groups.

4. The method of claim 1, wherein forming a suspension comprising polyhedral oligomeric silsesquioxane nanoparticles comprises forming a suspension comprising polyhedral oligomeric silsesquioxane nanoparticles and at least one of fumed silica, functionalized graphene, and functionalized carbon nanotubes.

5. The method of claim 1, wherein forming a suspension comprising polyhedral oligomeric silsesquioxane nanoparticles comprises forming a suspension comprising polyhedral oligomeric silsesquioxane nanoparticles bonded to at least one carbon-based nanoparticle.

6. The method of claim 5, wherein forming a suspension comprising polyhedral oligomeric silsesquioxane nanoparticles bonded to at least one carbon-based nanoparticle comprises forming at least one anionic functional group on the polyhedral oligomeric silsesquioxane nanoparticles and forming at least one cationic functional group on the at least one carbon-based nanoparticle and forming an ionic bond between the carbon-based nanoparticle and at least one of the polyhedral oligomeric silsesquioxane nanoparticles.

7. The method of claim 1, wherein forming a suspension comprising polyhedral oligomeric silsesquioxane nanoparticles comprises forming a suspension comprising polyhedral oligomeric silsesquioxane nanoparticles coated with functionalized graphene.

8. The method of claim 1, wherein forming a suspension comprising polyhedral oligomeric silsesquioxane nanoparticles comprises forming a suspension comprising at least one of graphene oxide, graphene, and carbon nanotubes coated with the polyhedral oligomeric silsesquioxane nanoparticles.

9. The method of claim 1, wherein forming a suspension comprising polyhedral oligomeric silsesquioxane nanoparticles comprises forming a suspension comprising a first portion of nanoparticles with at least one type of functional group and at least a second portion of nanoparticles with at least another type of functional group.

10. The method of claim 1, wherein forming a stabilized emulsion of the suspension and the hydrocarbons within the subterranean formation comprises contacting the hydrocarbons with the polyhedral oligomeric silsesquioxane nanoparticles.

11. A method of extracting a hydrocarbon material from a subterranean formation, the method comprising:
   mixing polyhedral oligomeric silsesquioxane nanoparticles with a carrier fluid, wherein the polyhedral oligomeric silsesquioxane has the general formula RSiO$_{1.5}$, wherein R comprises hydrogen, an inorganic group, or an organic group;

introducing the carrier fluid into a subterranean formation and contacting hydrocarbons within the subterranean formation with the nanoparticles to form an emulsion comprising the nanoparticles, an aqueous phase, and a hydrocarbon phase dispersed within the aqueous phase;

transporting the emulsion to a surface of the subterranean formation; and separating the hydrocarbons from the emulsion.

12. The method of claim 11, wherein mixing polyhedral oligomeric silsesquioxane nanoparticles with a carrier fluid comprises mixing polyhedral oligomeric silsesquioxane nanoparticles bonded with at least one of graphene nanoparticles and carbon nanotubes with the carrier fluid.

13. The method of claim 11, further comprising mixing fumed silica with the carrier fluid.

14. The method of claim 11, wherein mixing polyhedral oligomeric silsesquioxane nanoparticles with a carrier fluid comprises mixing the polyhedral oligomeric silsesquioxane nanoparticles with at least one of water, brine, steam, hexane, heptane, toluene, and benzene.

15. The method of claim 11, wherein mixing polyhedral oligomeric silsesquioxane nanoparticles with a carrier fluid comprises mixing polyhedral oligomeric silsesquioxane nanoparticles having a first functional group with fumed silica having a second, different functional group than the first functional group.

16. The method of claim 11, wherein separating the hydrocarbons from the emulsion comprises decreasing a pH of the emulsion to separate the aqueous phase from the hydrocarbon phase.

17. The method of claim 16, further comprising recycling at least a portion of the aqueous phase including the polyhedral oligomeric silsesquioxane nanoparticles to the carrier fluid.

18. The method of claim 11, wherein mixing polyhedral oligomeric silsesquioxane nanoparticles with a carrier fluid comprises mixing nanoparticles comprising polyhedral oligomeric silsesquioxane nanoparticles covalently bonded to carbon-based nanoparticles with a nitrogen atom with the carrier fluid.

19. The method of claim 11, wherein mixing polyhedral oligomeric silsesquioxane nanoparticles with a carrier fluid comprises mixing polyhedral oligomeric silsesquioxane nanoparticles coated with metals with the carrier fluid.

20. The method of claim 19, wherein mixing polyhedral oligomeric silsesquioxane nanoparticles coated with metals with the carrier fluid comprises mixing nanoparticles comprising polyhedral oligomeric silsesquioxane coated with graphene, the graphene coated with one or more metals.

* * * * *

UNITED STATES PATENT AND TRADEMARK OFFICE
CERTIFICATE OF CORRECTION

PATENT NO. : 9,873,827 B2
APPLICATION NO. : 14/519496
DATED : January 23, 2018
INVENTOR(S) : Soma Chakraborty et al.

It is certified that error appears in the above-identified patent and that said Letters Patent is hereby corrected as shown below:

In the Specification

| Column 3, | Line 41, | change "fluid. In sonic" to --fluid. In some-- |
| Column 3, | Lines 43, 44, | change "functionalized grapheme, and" to --functionalized graphene, and-- |
| Column 5, | Line 4, | change "acetamide), a cyanate" to --e.g., acetamide), a cyanate-- |
| Column 7, | Line 43, | change "group, in some" to --group. In some-- |
| Column 10, | Line 58, | change "used in the web" to --used in the well-- |
| Column 11, | Line 49, | change "particular firms disclosed." to --particular forms disclosed.-- |

Signed and Sealed this
Twenty-ninth Day of May, 2018

Andrei Iancu
*Director of the United States Patent and Trademark Office*